No. 703,551. Patented July 1, 1902.
C. S. CROW.
BOTTOM FOR MILK PAILS.
(Application filed Dec. 7, 1901.)
(No Model.)
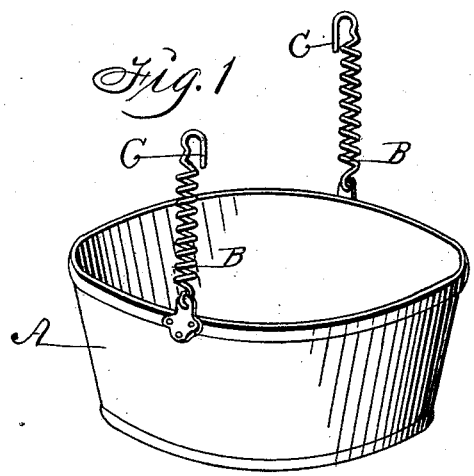
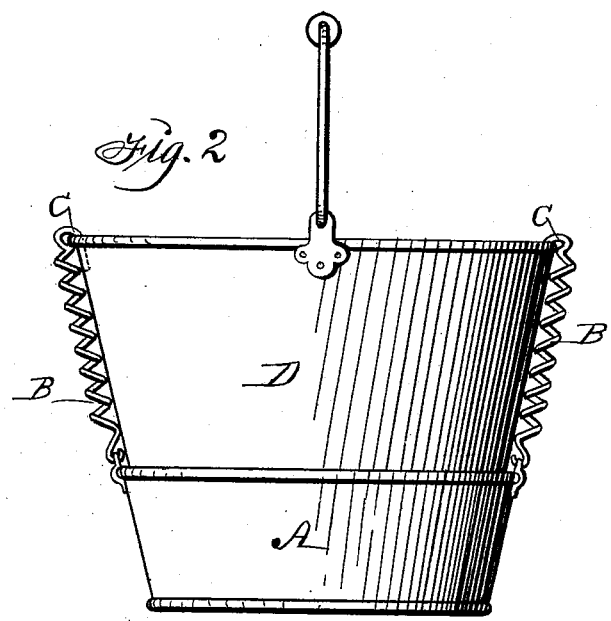
Witnesses:
L. H. Orwig.
R. H. Orwig.
Inventor: Charles S. Crow,
By Thomas O. Orwig, Attorney.

UNITED STATES PATENT OFFICE.

CHARLES S. CROW, OF FRENDALE, IOWA.

BOTTOM FOR MILK-PAILS.

SPECIFICATION forming part of Letters Patent No. 703,551, dated July 1, 1902.

Application filed December 7, 1901. Serial No. 85,060. (No model.)

*To all whom it may concern:*

Be it known that I, CHARLES S. CROW, a citizen of the United States, residing at Frendale, in the county of Johnson and State of Iowa, have invented a new and useful Auxiliary and Detachable Bottom for Milk-Pails, of which the following is a specification.

My object is to promote cleanliness in using milk-pails while milking cows and in the use of water for cooling milk as it is drawn from a cow's udder into a pail.

Heretofore it has been a common practice to place a pail direct upon the ground and under a cow in such a manner that the bottom of the pail when the ground was wet became muddy or soiled by contact with adhesive matter.

My invention consists in a detachable bottom adapted to serve as a mud-guard for a milk-pail, and it is constructed as hereinafter set forth, pointed out in my claims, and illustrated in the accompanying drawings, in which—

Figure 1 is a perspective view of the device ready for use. Fig. 2 shows it applied to a milk-pail as required for practical use.

The letter A designates an open-topped vessel or auxiliary bottom for a milk-pail. It is made of sheet metal and is larger in diameter than the bottom portion of the pail to which it is to be attached. Extensible coil-springs B are attached to the top of the vessel and terminate in hooks C, adapted to engage the top of a milk-pail D, as shown in Fig. 2, and to retain the attachment securely in place as required to keep the bottom portion of the milk-pail clean and also as required for filling water in the annular space between the milk-pail and the attachment to aid in cooling the warm milk as it flows into the pail from the udder of a cow.

By means of the extensible coil-spring the auxiliary bottom can be readily, securely, and advantageously and detachably connected with milk-pails differing in height and diameter.

Having thus described the purpose, construction, and application of my invention, its practical operation and utility will be readily understood by persons familiar with the art to which it pertains, and

What I claim as new, and desire to secure by Letters Patent, is—

An attachment for milk-pails consisting of an open-topped vessel adapted to inclose the bottom portion of a milk-pail and provided with extensible coil-springs fixed to its top-edge portion, and terminating in hooks adapted to engage the top edge of a milk-pail, in the manner set forth, for the purposes stated.

CHARLES S. CROW.

Witnesses:
MILO J. WHITTINGTON,
G. A. O'BRIEN.